US005604192A

United States Patent [19]

Michael et al.

[11] Patent Number: 5,604,192

[45] Date of Patent: Feb. 18, 1997

[54] HARD SURFACE DETERGENT COMPOSITIONS

[75] Inventors: Daniel W. Michael; Thomas A. Borcher, Sr., both of Cincinnati, Ohio

[73] Assignee: The Procter & Gamble Company, Cincinnati, Ohio

[21] Appl. No.: 360,542

[22] Filed: Dec. 21, 1994

Related U.S. Application Data

[63] Continuation-in-part of Ser. No. 263,588, Jun. 22, 1994, abandoned.

[51] Int. Cl.[6] .............................. C11D 9/00; C11D 15/00; C11D 1/12; C09D 9/00

[52] U.S. Cl. .............................. 510/180; 510/181; 510/191; 510/238; 510/243; 510/405; 510/413; 510/437

[58] Field of Search .............................. 252/108, 122, 252/549, 554, 170, 174.21, DIG. 1; 510/181, 191, 238, 243, 405, 413, 437

[56] References Cited

U.S. PATENT DOCUMENTS

| | | | |
|---|---|---|---|
| 3,943,954 | 3/1976 | Flournoy et al. | 137/13 |
| 4,013,607 | 3/1977 | Dwyer et al. | 260/29.6 |
| 4,066,746 | 1/1978 | Callingham et al. | 424/62 |
| 4,130,425 | 12/1978 | Boyd | 96/48 |
| 4,286,956 | 9/1981 | Bechstedt | 8/137 |
| 4,446,043 | 5/1984 | Tai | 252/105 |
| 4,609,511 | 9/1986 | Fischer et al. | 264/51 |
| 4,675,125 | 6/1987 | Sturwold | 252/118 |
| 4,970,028 | 11/1990 | Kenyon et al. | 252/544 |
| 5,102,574 | 4/1992 | Russell et al. | 252/174.21 |
| 5,108,660 | 4/1992 | Michael | 252/545 |

FOREIGN PATENT DOCUMENTS

| | | | |
|---|---|---|---|
| 042648A1 | 12/1981 | European Pat. Off. | C11D 9/02 |
| 93/15172 | 8/1993 | WIPO | C11D 1/83 |

OTHER PUBLICATIONS

Angus Chemical Company Technical Bulletin – TB31 – "AMP–95 as a Wax Emulsifier" no month or date available.

Angus Chemical Company Technical Bulletin – TB78 – "Amino Alcohols as Neutralizing Agents in Personal Care and Pharmaceutical Formulations" no month or date available.

*Primary Examiner*—Anthony McFarland
*Assistant Examiner*—Patricia L. Hailey
*Attorney, Agent, or Firm*—Robert B. Aylor

[57] ABSTRACT

Detergent compositions comprising nonionic detergent surfactant; unsaturated soap, i.e., oleate and/or ricinoleate; hydrophobic cleaning solvent; and aqueous solvent system. The compositions have excellent detergency properties and excellent filming/streaking properties. Preferred soaps are specific betaaminoalkanolammonium soaps, which provide superior filming/streaking properties as compared to, e.g., sodium soap.

21 Claims, No Drawings

HARD SURFACE DETERGENT COMPOSITIONS

This application is a continuation-in-part of our identically titled United States patent application Ser. No.08/263,588, filed Jun. 22, 1994, now abandoned.

FIELD OF THE INVENTION

This invention pertains to detergent compositions for hard surfaces. Such compositions typically contain detergent surfactants, detergent builders, and/or solvents to accomplish their cleaning tasks.

BACKGROUND OF THE INVENTION

The use of hard surface cleaning compositions containing organic water-soluble synthetic detergents, solvents, and, optionally, detergent builders are known.

An object of the present invention is to provide detergent compositions which provide both (a) good cleaning for all of the usual hard surface cleaning tasks found in the home and (b) preferred filming/streaking characteristics.

SUMMARY OF THE INVENTION

The present invention relates to hard surface detergent composition, preferably aqueous, comprising: (a) nonionic detergent surfactant; (b) unsaturated soap of fatty acids having a titer of less than about 10° C. and a water soluble cation, e.g., preferably an oleate, ricinoleate, or mixture of oleate and ricinoleate, as described hereinafter; and (c) the balance typically being an aqueous solvent system comprising water and minor ingredients, especially materials to retard or prevent degradation of the ingredients in the composition, said composition having a pH of from about 8 to about 12.5, preferably from about 8.5 to about 11, more preferably from about 9.5 to about 10.5, and the ratio of the nonionic detergent surfactant to unsaturated soap preferably being more than about 1:3, said composition being essentially free of boramide as described hereinafter. The composition can also contain, optionally, additional surfactants and/or polycarboxylate detergent builders and/or buffering system, preferably mixtures of carbonates and bicarbonates (to maintain the desired pH). The compositions can be formulated either as concentrates, or at usage concentrations.

DETAILED DESCRIPTION OF THE INVENTION

(a) The Nonionic Detergent Surfactant

In accordance with the present invention, it has been found that the combination of nonionic detergent surfactant, which provides superior cleaning on oily/greasy soils, with certain unsaturated fatty acid soaps, as described hereinafter, provides superior hard surface cleaning compositions with superior filming/streaking characteristics.

The combination of the nonionic detergent surfactant and the unsaturated soap provides the main cleaning and emulsifying benefits herein. Nonionic detergent surfactants useful herein include any of the well-known nonionic detergent surfactants that have an HLB of from about 6 to about 18, preferably from about 8 to about 16, more preferably from about 10 to about 15. Typical of these are alkoxylated (especially ethoxylated) alcohols and alkyl phenols, and the like, which are well-known from the detergency art. In general, such nonionic detergent surfactants contain an alkyl group in the $C_{6-22}$, preferably $C_{8-18}$, more preferably $C_{8-14}$, range and generally contain from about 2.5 to about 12, preferably from about 4 to about 10, more preferably from about 5 to about 8, ethylene oxide groups, to give an HLB of from about 8 to about 16, preferably from about 10 to about 15. Ethoxylated alcohols are especially preferred in the compositions of the present type.

Specific examples of nonionic detergent surfactants useful herein include decyl polyethoxylate(2.5); coconut alkyl polyethoxylate(6.5); and decyl polyethoxylate(6).

A detailed listing of suitable nonionic surfactants, of the above types, for the detergent compositions herein can be found in U.S. Pat. No. 4,557,853, Collins, issued Dec. 10, 1985, incorporated by reference herein. Commercial sources of such surfactants can be found in McCutcheon's EMULSIFIERS AND DETERGENTS, North American Edition, 1984, McCutcheon Division, MC Publishing Company, also incorporated herein by reference.

The compositions can also contain one, or more, additional nonionic surfactants, e.g., with higher levels of ethoxylation. Such nonionic surfactants can contain hydrophobic groups containing from about 8 to about 18, preferably from about 12 to about 14, carbon atoms and from about 20 to about 40, preferably about 30, ethoxy groups. The additional nonionic surfactant can provide advantages, depending on the circumstances, such as friction reduction and/or improved cleaning kinetics.

The nonionic detergent surfactant typically comprises from about 1% to about 25%, preferably from about 2% to about 20%, more preferably from about 2.5% to about 15% of the composition.

(b) The Unsaturated Soap

As discussed hereinbefore, the titer of the fatty acids used to form the soap should normally be less than about 10° C. The majority of the unsaturated soap is normally oleate, and/or ricinoleate. These unsaturated soaps provide a surprisingly good cleaning function while promoting exceptional filming/streaking properties.

Surprisingly, the soap that provides the best filming/streaking properties is one wherein said unsaturated soap is formed from fatty acids and a water soluble cation in which the fatty acids comprise: from about 50% to about 95%, preferably from about 60% to about 90%, more preferably from about 70% to about 90%, oleic, ricinoleic, or mixture of oleic and ricinoleic acids; less than about 20%, preferably less than about 15%, more preferably from about 5% to about 10% of saturated fatty acid, although with respect to stearic acid, there should be less than about 4%, preferably less than about 2%, most preferably less than about 1%; and from about about 2% to about 35%, preferably from about 5% to about 20%, more preferably from about 5% to about 10%, of polyunsaturated fatty acids, with preferably less than about 5% linolenic and, more preferably less than about 2%, most preferably less than about 1%, linolenic fatty acid. The balance of the fatty acid can consist of other monounsaturated fatty acids, particularly palmitoleic. These other monounsaturated fatty acids are preferably no more than about 15% of the fatty acids.

The cation for the soap can be any of those cations normally used in cleaning compositions, especially sodium, potassium, ammonium, substituted ammonium, e.g., mono-, di-, or tri-alkanolammoniums, etc. However, the preferred cation is derived from beta-aminoalkanol compounds having the formula:

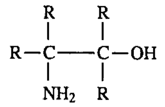

wherein each R is selected from the group consisting of hydrogen and alkyl groups containing from one to four carbon atoms and the total of carbon atoms in the compound is from three to six, preferably four. These compounds, when protonated, function as the cation for the soap. The preferred beta-aminoalkanols have a primary hydroxy group. The amine group is preferably not attached to a primary carbon atom. More preferably the amine group is attached to a tertiary carbon atom to minimize the reactivity of the amine group. Preferred beta-aminoalkanols are 2-amino,1-butanol; 2-amino,2-methylpropanol; and mixtures thereof. The most preferred beta-aminoalkanol is 2-amino,2-methylpropanol since it has the lowest molecular weight of any beta-aminoalkanol which has the amine group attached to a tertiary carbon atom.

The unsaturated soaps formed from the beta-aminoalkanols typically have the formula:

$$[R^1C(O)^{(-)}][NH_3^{(+)}\text{-}C(R)_2\text{-}C(R)_2OH]$$

wherein $R^1C(O)^{(-)}$ is derived from fatty acids having a titer of less than about 10, preferably consisting essentially of oleyl and/or ricinoleyl groups, and R has the meaning given hereinbefore.

The unsaturated soaps formed from the beta-aminoalkanols are surprisingly better than those formed with sodium, potassium and/or conventional aminoalkanols like, e.g., monoethanolamine, for hard surface detergent compositions. The soaps of such protonated beta-aminoalkanols have superior spotting/filming properties when used on hard surfaces. This is especially important for cleaning of glossy surfaces where spots are aesthetically undesirable.

The ratio of nonionic detergent surfactant to soap is at least about 1:3, typically from about 1:2 to about 8:1, preferably from about 1:1 to about 6:1, more preferably from about 2:1 to about 4:1. The level of unsaturated soap in the composition is typically from about 0.5% to about 20%, preferably from about 2% to about 10%. The level of polyunsaturated and/or saturated soap should be less than about 35%, preferably less than about 30%, and more preferably less than about 20%, preferably with at least about 4%, more preferably with at least about 8% polyunsaturated, and less than about 15%, preferably less than about 10% saturated soap. The level of triunsaturated soap, e.g., linolenic soap, should be less than about 2%, preferably less than about 1%. The level of saturated soap is limited to avoid filming/streaking problems, but saturated soap can be used to lower the level of sudsing.

(c) The Aqueous Solvent System

The level of water is from about 50% to about 97%, preferably from about 5% to about 95%. The aqueous solvent system also can comprise polar solvents as described hereinafter.

(d) Optional Ingredients

The compositions herein can also contain other various adjuncts which are known to the art for detergent compositions so long as they are not used at levels that cause unacceptable spotting/filming. However, the compositions herein should be essentially free of boramide as described in U.S. Pat. No. 4,675,125, Sturwold, especially at column 3, line 65 through column 4, line24, said patent being incorporated herein by reference. Nonlimiting examples of such adjuncts are:

Low levels of other detergent surfactants, e.g., synthetic anionic detergent surfactants, (as discussed hereinafter), and zwitterionic detergent surfactants;

Low levels of bacteriocides;

Low levels of detergent builders;

Enzymes such as proteases;

Hydrotropes such as sodium toluene sulfonate, sodium cumene sulfonate and potassium xylene sulfonate (which are preferred components for viscosity control); and Aesthetic-enhancing ingredients such as colorants and perfumes, providing they do not adversely impact on spotting/filming in the cleaning of glass. The perfumes are preferably those that are more water-soluble and/or volatile to minimize spotting and filming.

Optional Sulfated or Sulfonated Detergent Surfactant

Typical synthetic anionic sulfated and/or sulfonated detergent surfactants are the alkyl- and alkylethoxylate- (polyethoxylate) sulfates, paraffin sulfonates, alkyl benzene sulfonates, olefin sulfonates, alpha-sulfonates of fatty acids and of fatty acid esters, and the like, which are well known from the detergency art. In general, such detergent surfactants contain an alkyl group in the $C_8$-$C_{22}$, preferably $C_{8-18}$, more preferably $C_{8-14}$, range. The anionic detergent surfactants can be used in the form of their sodium, potassium or alkanolammonium, e.g., triethanolammonium salts. $C_8$-$C_{18}$ paraffin-sulfonates, $C_{8-16}$ alkyl sulfates, and $C_{9-15}$ alkyl benzene sulfonates are especially preferred in the compositions of the present type.

A detailed listing of suitable anionic detergent surfactants, of the above types, for the detergent compositions herein can be found in U.S. Pat. No. 4,557,853, Collins, issued Dec. 10, 1985, incorporated by reference hereinbefore. Commercial sources of such surfactants can be found in McCutcheon's EMULSIFIERS AND DETERGENTS, North American Edition, 1984, McCutcheon Division, MC Publishing Company, also incorporated hereinbefore by reference.

Short chain olefin sulfonates are desirable, but should be substantially free of disulfonates which hurt filming/streaking. Preferably the level of disulfonate is less than about 35% of the olefin sulfonate.

The anionic detergent cosurfactant component is typically present at a level of from about 0.1% to about 8%, more preferably from about 0.25% to about 5%. Anionic detergent surfactants are desirably present in limited amounts to promote rinsing of the surfaces. However, the level of synthetic anionic detergent surfactant should be less than about one half of the nonionic detergent surfactant.

Optional Hydrophobic Solvent

The level of hydrophobic solvent is typically from about 0.5% to about 15%, preferably from about 1% to about 12%, most preferably from about 2% to about The level of hydrophobic solvent should not be more than the level of surfactant. The hydrophobic solvent is used primarily to reduce viscosity in the compositions, preferably in combination with, or as an alternative to, conventional hydrotropes.

Preferably such solvents do not comprise hydrocarbon or halogenated hydrocarbon moieties of the alkyl or cycloalkyl type. Preferably such solvents have a boiling point well above room temperature, i.e., above about 20° C.

The hydrophobic solvents are preferably glycol ether solvents, especially those having the formula $R^1O-(R^2O-)_mH$ wherein each $R^1$ is an alkyl group which contains from about 1 to about 8 carbon atoms, each $R^2$ is either ethylene or propylene, and m is a number from 1 to about 3. The most preferred glycol ethers are selected from the group consisting of: tripropylene glycol monomethyl ether; tripropylene glycol monobutyl ether; dipropyleneglycolmonobutyl ether; monopropyleneglycolmonobutyl ether; diethyleneglycolmonohexyl ether; diethyleneglycolmonobutyl ether; monoethyleneglycolmonohexyl ether; and mixtures thereof.

The butoxy-propanol solvent should have no more than about 20%, preferably no more than about 10%, more preferably no more than about 7%, of the secondary isomer in which the butoxy group is attached to the secondary atom of the propanol for improved odor.

Another type of solvent which can be used for these hard surface cleaner compositions comprises diols having from 6 to about 16 carbon atoms in their molecular structure.

Other solvents such as benzyl alcohol, n-hexanol, and phthalic acid esters of $C_{1-4}$ alcohols can also be used.

Terpene solvents and pine oil, are another class of useful solvents that also convey a deodorization and/or disinfectancy benefit.

Optional Monoethanolamine and/or Beta-aminoalkanol

Free, non-protonated monoethanolamine and/or beta-aminoalkanol compounds serve primarily as solvents when the pH is above about 10, and especially above about 10.7. They also provide alkaline buffering capacity during use. However, the most unique contribution they make is to improve the spotting/filming properties of hard surface cleaning compositions. These unprotonated amines are volatile, noncrystalline, alkaline buffers.

Free monoethanolamine and/or beta-alkanolamine, when present, are used at a level of from about 0.05% to about 5%, preferably from about 0.2% to about 3%. For dilute compositions they are typically present at a level of from about 0.05% to about 2%, preferably from about 0.1% to about 1%, more preferably from about 0.2% to about 0.7%. For concentrated compositions they are typically present at a level of from about 0.5% to about 5%, preferably from about 1% to about 3%.

The beta-aminoalkanols preferably have boiling points below about 175° C. Preferably, the boiling point is within about 5° C. of 165° C.

Such beta-aminoalkanols are excellent materials for hard surface cleaning in general and, in the present application, have certain desirable characteristics.

Optional Polar Sovents

Polar solvents with only minimal cleaning action like methanol, ethanol, isopropanol, ethylene glycol, propylene glycol, and mixtures thereof, can be used at levels of from about 0.5% to about 10%, preferably less than about 5% to promote stability and/or viscosity control.

Optional Zwitterionic Detergent Surfactants

Zwitterionic detergent surfactants contain both cationic and anionic hydrophilic groups on the same molecule at a relatively wide range of pH's. The typical cationic group is a quaternary ammonium group, although other positively charged groups like sulfonium and phosphonium groups can also be used. The typical anionic hydrophilic groups are carboxylates and sulfonates, although other groups like sulfates, phosphates, etc. can be used. A generic formula for some preferred zwitterionic detergent surfactants is:

$$R-N^{(+)}(R^2)(R^3)R^4X^{(-)}$$

wherein R is a hydrophobic group; $R^2$ and $R^3$ are each $C_{1-4}$ alkyl, hydroxy alkyl or other substituted alkyl group which can also be joined to form ring structures with the N; $R^4$ is a moiety joining the cationic nitrogen atom to the hydrophilic group and is typically an alkylene, hydroxy alkylene, or polyalkoxy group containing from about one to about four carbon atoms; and X is the hydrophilic group which is preferably a carboxylate or sulfonate group.

Specific zwitterionic detergent surfactants useful herein are described in detail in U.S. Pat. No. 5,108,660, Michael and U.S. Pat. No. 5,061,393, Linares and Cilley, both of said patents being incorporated herein by reference.

Other zwitterionic detergent surfactants useful herein include hydrocarbyl, e.g., fatty, amidoalkylenebetaines. These detergent surfactants have the genetic formula:

$$R-C(O)-N(R^2)-(CR^3_2)_n-N(R^2)_2^{(+)}-(CR^3_2)_n-C(O)O^{(-)}$$

wherein each R is a hydrocarbon, e.g., an alkyl group containing from about 8 up to about 20, preferably up to about 18, more preferably up to about 16 carbon atoms, each $(R^2)$ is either hydrogen or a short chain alkyl or substituted alkyl containing from one to about four carbon atoms, preferably groups selected from the group consisting of methyl, ethyl, propyl, hydroxy substituted ethyl or propyl and mixtures thereof, preferably methyl, each $(R^3)$ is selected from the group consisting of hydrogen and hydroxy groups, and each n is a number from 1 to about 4, preferably from 2 to about 3; more preferably about 3, with no more than about one hydroxy group in any $(CR^3_2)$ moiety. The R groups can be branched and/or unsaturated, and such structures can provide spotting filming benefits, even when used as part of a mixture with straight chain alkyl R groups.

An example of such a detergent surfactant is a $C_{10-14}$ fatty acylamidopropylenebetaine available from the Miranol Company under the trade name "Mirataine BD".

The level of zwitterionic detergent surfactant in the composition, when present, is typically from 0% to about 0.5%, preferably from about 0.02% to about 0.5%, more preferably from about 0.05% to about 0.25%.

Optional Polycarboxylate Detergent Builders

Polycarboxylate detergent builders useful herein, include the builders disclosed in U.S. Pat. No. 4,915,854, Mao et al., issued Apr. 10, 1990, and incorporated herein by reference. Suitable detergent builders preferably have relatively strong binding constants for calcium. Preferred detergent builders include citrates and, especially, builders whose acids have the generic formula:

$$R^5-[O-CH(COOH)CH(COOH)]_nR^5$$

wherein each $R^5$ is selected from the group consisting of H and OH and n is a number from about 2 to about 3 on the average. Other preferred detergent builders include those described in U.S. Pat. No. 5,202,050, Culshaw et al., said patent being incorporated herein by reference. Citrates are preferred builders, since they help retard/prevent the degradation of the unsaturated fatty acyl groups, which can result in the formation of odor materials.

In addition to the above detergent builders, other detergent builders that are relatively efficient for hard surface cleaners and/or, preferably, have relatively reduced filming/streaking characteristics include those disclosed in U.S. Pat. No. 4,769,172, Siklosi, issued Sep. 6, 1988, and incorporated herein by reference. Still others include the chelating agents having the formula:

$$R-N-(CH_2COOM)_2$$

wherein R is selected from the group consisting of: $(-CH_2CH_2CH_2OH)$; $[-CH_2CH(OH)CH_3]$; $[-CH_2CH(OH)CH_2OH]$; $[-CH(CH_2OH)_2]$; $(-CH_3)$; $(-CH_2CH_2OCH_3)$; $[-C(O)-CH_3]$; $[-CH_2-C(O)-NH_2]$; $(-CH_2CH_2CH_2OCH_3)$; $[-C(CH_2OH)_3]$; and mixtures thereof, and each M is hydrogen.

Chemical names of the acid form of the chelating agents herein include: N(3-hydroxypropyl)imino-N,N-diacetic acid (3-HPIDA); N(-2-hydroxypropyl)imino-N,N-diacetic acid (2-HPIDA); N-glycerylimino-N,N-diacetic acid (GLIDA); dihydroxyisopropylimino-(N,N)-diacetic acid (DHPIDA); methylimino-(N,N)-diacetic acid (MIDA); 2-methoxyethylinfino-(N,N)-diacetic acid (MEIDA); amidoiminodiacetic acid (also known as sodium amidonitrilo triacetic, SAND); acetamidoiminodiacetic acid (AIDA); 3-methoxypropyliminio-N,N-diacetic acid (MEPIDA); and tris(hydroxymethyl)methyl-imino-N,N-diacetic acid (TRIDA).

Methods of preparation of the iminodiacetic derivatives herein are disclosed in U.S. Pat. No. 5,108,660, Michael, issued Apr. 28, 1992, said patent being incorporated herein by reference.

The chelating agents of the invention, when they are present, are at levels of from about 0.5% to about 15.0% of the total composition, preferably from about 1.0% to about 10%, more preferably from about 1.0% to about 5.0%.

The detergent builders can help provide the desired pH in use. However, if necessary, the composition can also contain additional buffering materials to give the desired pH in use. pH is usually measured on the product.

Optional Perfumes

Most hard surface cleaner products contain some perfume to provide an olfactory aesthetic benefit and to cover any "chemical" odor that the product may have. The main function of a small fraction of the highly volatile, low boiling (having low boiling points), perfume components in these perfumes is to improve the fragrance odor of the product itself, rather than impacting on the subsequent odor of the surface being cleaned. However, some of the less volatile, high boiling perfume ingredients can provide a fresh and clean impression to the surfaces. Perfume ingredients are readily solubilized in the compositions by the nonionic detergent surfactant and the soap. Selection of any perfume component, or amount of perfume, is based solely on aesthetic considerations. Suitable perfume compounds and compositions can be found in the art including U.S. Pat. Nos. 4,145,184, Brain and Cummins, issued Mar. 20, 1979; 4,209,417, Whyte, issued Jun. 24, 1980; 4,515,705, Moeddel, issued May 7, 1985; and 4,152,272, Young, issued May 1, 1979, all of said patents being incorporated herein by reference. Specific perfume materials are described in U.S. Pat. 5,108,660, incorporated by reference hereinbefore.

Optional Bacteriocides

Examples of bacteriocides that can be used in the compositions of this invention are parabens, especially methyl paraben, glutaraldehyde, formaldehyde, 2-bromo-2-nitropropane-1,3-diol sold by Inolex Chemicals under the trade name Bronopol®, and a mixture of 5-chloro-2-methyl-4-isothiazoline-3-one and 2-methyl-4-isothiazoline-3-one sold by Rohm and Haas Company under the trade name Kathon® CG/ICP. Typical levels of bacteriocides used in the present compositions are from about 1 ppm to about 2,000 ppm by weight of the composition, depending on the type of bacteriocide selected. Methyl paraben is especially effective for preventing mold growth in aqueous compositions with under 10% by weight of unsaturated compound.

These compositions have exceptionally good cleaning properties. They also have good "shine" properties, i.e., when used to clean glossy surfaces, without rinsing, they have much less tendency than e.g., phosphate built products to leave a dull finish on the surface.

The present invention also comprises the process of cleaning hard surfaces which comprises diluting the compositions herein with water at a ratio of from about 512:1 to about 32:1, preferably from about 256:1 to about 64:1, more preferably from about 150:1 to about 100:1, water to composition. The dilute wash solutions that are created by this process are then used to clean floors and other hard surfaces. The total suffactant levels in the wash solutions are typically from about 1% to about 0.02%, preferably from about 0.5% to about 0.04%, more preferably from about 0.25% to about 0.1%.

All parts, percentages, and ratios herein are "by weight" unless otherwise stated. All numerical values are approximations unless otherwise stated.

The invention is illustrated by the following Examples.

EXAMPLES 1-3

| Example No.: Ingredient | 1 Wt. % | 2 Wt. % | 3 Wt. % |
|---|---|---|---|
| Neodol ® R91-6 [$C_{9-11}$ alkyl polyethoxylate (6)] | 15.0 | 12.0 | 12.0 |
| Neodol 23-3 [$C_{12-13}$ alkyl polyethoxylate (3)] | — | 4.0 | — |
| Surfonic ® L24-30 [$C_{12-14}$ alkyl polyethoxylate (30)] | — | — | 4.0 |
| Oleic Acid | 3.8 | 3.8 | 3.8 |
| Sodium Cumene Sulfonate | 2.5 | 3.5 | 3.0 |
| 2-amino-2-methyl-propanol | 1.2 | 1.2 | 1.2 |
| Hydrophobic Perfume[1] | 1.2 | 1.2 | 1.2 |
| Potassium Carbonate | 0.9 | 0.9 | 0.9 |
| Deionized Water and Minors | q.s. | q.s. | q.s. |
| pH | 9.8 | 9.8 | 9.8 |

Neodol is a tradename used by Shell Chemical Co.
Alfonic is a tradename used by Vista Chemical.
Surfonic is a tradename used by Texaco Corp.
[1]Hydrophobic perfume contains terpenes, terpene alcohols, and other typical water-insoluble perfume ingredients.

EXAMPLES 4–6

| Example No.: Ingredient | 4 Wt. % | 5 Wt. % | 6 Wt. % |
|---|---|---|---|
| Neodol ® R91-6 [$C_{9-11}$ alkyl poly-ethoxylate (6)] | 16.0 | — | — |
| Alfonic ® 810-65 [$C_{8-10}$ alkyl poly-ethoxylate (6)] | — | 15.0 | 12.0 |
| Oleic Acid | 3.8 | 3.0 | 3.0 |
| Sodium Cumene Sulfonate | 2.0 | 2.0 | 2.0 |
| Hydrophobic Perfume | 1.2 | 1.2 | 1.2 |
| 2-amino-2-methyl-propanol | — | 0.9 | 0.9 |
| Potassium Hydroxide | 0.8 | — | — |
| Potassium Carbonate | 0.9 | 0.7 | 0.7 |
| Deionized Water and Minors | q.s. | q.s. | q.s. |
| pH | 9.8 | 9.8 | 9.8 |

EXAMPLES 7–9

| Example No.: Ingredient | 7 Wt. % | 8 Wt. % | 9 Wt. % |
|---|---|---|---|
| Neodol ® R91-6 [$C_{9-11}$ alkyl poly-ethoxylate (6)] | 12.0 | 10.0 | 12.0 |
| Neodol 23-3 [$C_{12-13}$ alkyl poly-ethoxylate (3)] | — | 2.0 | — |
| Surfonic ® L24-30 [$C_{12-14}$ alkyl poly-ethoxylate (30)] | — | 4.0 | 4.0 |
| Oleic Acid | 3.8 | 3.8 | 3.8 |
| Sodium Octyl Sulfate | 2.0 | 4.0 | — |
| Sodium Secondary $C_{14-16}$ Alkane Sulfonate | — | — | 2.0 |
| Sodium Cumene Sulfonate | 1.5 | 3.5 | 3.0 |
| Hydrophobic Perfume | 1.2 | 1.2 | 1.2 |
| 2-amino-2-methyl-propanol | 1.2 | 1.2 | 1.2 |
| Potassium Carbonate | 0.9 | 0.9 | 0.9 |
| Deionized Water and Minors | q.s. | q.s. | q.s. |
| pH | 9.8 | 9.8 | 9.8 |

EXAMPLES 10–12

| Example No.: Ingredient | 10 Wt. % | 11 Wt. % | 12 Wt. % |
|---|---|---|---|
| Neodol ® R91-6 [$C_{9-11}$ alkyl poly-ethoxylate (6)] | 16.0 | — | — |
| Alfonic ® 810-65 [$C_{8-10}$ alkyl poly-ethoxylate (6)] | — | 10.0 | 10.0 |
| Neodol 23-3 [$C_{12-13}$ alkyl poly-ethoxylate (3)] | — | 4.0 | 4.0 |
| Surfonic ® L24-30 [$C_{12-14}$ alkyl poly-ethoxylate (30)] | — | 4.0 | 4.0 |
| Oleic Acid | 3.8 | 2.0 | 2.0 |
| Sodium Octyl Sulfate | — | 4.0 | 3.0 |
| Sodium Secondary $C_{14-16}$ Alkane Sulfonate | 4.0 | — | — |
| Sodium Cumene Sulfonate | 2.0 | 2.0 | — |
| Hydrophobic Perfume | 1.2 | 1.2 | 1.2, |

-continued

| Example No.: Ingredient | 10 Wt. % | 11 Wt. % | 12 Wt. % |
|---|---|---|---|
| Potassium Hydroxide | 0.8 | — | — |
| Diethylene Glycol Monobutyl Ether | — | — | 4.0 |
| 2-amino-2-methyl-propanol | — | 1.2 | 1.2 |
| Potassium Carbonate | 0.9 | 1.5 | 1.5 |
| 2-hexyl Decanol | — | 0.6 | 0.6 |
| Deionized Water and Minors | q.s. | q.s. | q.s. |
| pH | 9.8 | 10.5 | 10.5 |

EXAMPLES 13–15

| Example No.: Ingredient | 13 Wt. % | 14 Wt. % | 15 Wt. % |
|---|---|---|---|
| Neodol ® R91-6 [$C_{9-11}$ alkyl poly-ethoxylate (6)] | 12.0 | 12.0 | 12.0 |
| Unsaturated Fatty Acid A | 3.8 | — | — |
| Unsaturated Fatty Acid B | — | 3.8 | — |
| Unsaturated Fatty Acid C | — | 3.8 | |
| Sodium Alkane ($C_{14-16}$) Sulfonate | 1.0 | 1.0 | 1.0 |
| 2-amino-2-methyl-propanol | 1.2 | 1.2 | 1.2 |
| Potassium Carbonate | 1.0 | 1.0 | 1.0 |
| Distilled Water and Minors | q.s. | q.s. | q.s. |
| pH | 9.5 | 9.9 | 9.5 |

Neodol is a tradename used by Shell Chemical Co.
Alfonic is a tradename used by Vista Chemical.
Surfonic is a tradename used by Texaco Corp.

The following are the definitions of fatty acids used in the soaps used in EXAMPLES 13–15.

| Unsaturated Fatty Acids | A | B | C |
|---|---|---|---|
| Total saturated fatty acids | 9% | 4% | 52% |
| Stearic acid | <1% | 3% | 2% |
| Oleic acid | 73% | 91% | 39% |
| Linoleic acid | 8% | 5% | 8% |
| Linolenic acid | 1% | 0% | <0.5% |
| Other Monounsaturated fatty acids | ~9% | <0.5% | <0.5% |

Filming/Streaking Stress Test

Spondex cellulose sponges are cut to 2×4×1 inches, cleaned of all factory preservatives, rinsed well, and soaked in 110° F. water. One foot square "no wax" floor tiles are cleaned with a mild cleaner and isopropyl alcohol, rinsed with distilled water, and dried with paper towels. The test product is diluted, as indicated, with 110° F. tap water and maintained at that temperature. 15–25 mls. of test solution are placed on a sponge carrier, excess water is squeezed from a sponge and the sponge is placed on the carrier and squeezed to soak up the test solution.

Each product is tested on a single tile by wiping the product-soaked sponge across the entire surface in a continuous vertical motion. There are at least three replications. The tiles are air dried at room temperature for 20 minutes. Expert graders grade the tiles on the scale of: 0–6 where 0=no visible filming/streaking and 6=very poor filming/streaking. The grades are averaged. Room temperature and humidity have been shown to influence filming/streaking. Therefore these variables are always recorded.

The above EXAMPLES 13–15 are tested for filming/streaking using a 1:128 dilution with water, three replications, and three expert graders; relative humidity of about 45%, water hardness of about 8 grains, and room temperature of about 23° C. The filming/streaking grades are EXAMPLE 13=0.7; EXAMPLE 14=1.8; and EXAMPLE 15=1.7. The least significant difference for this test at the 95% confidence level is about 0.4. Therefore, the grade for EXAMPLE 13 is statistically superior to both EXAMPLE 14 and EXAMPLE 15 and fatty acid A is superior to both fatty acids A and B.

What is claimed is:

1. A hard surface detergent composition comprising: (a) nonionic detergent surfactant; (b) unsaturated soap of fatty acids having a titer of less than about 10° C. and a water soluble cation, the ratio of said nonionic detergent surfactant to said unsaturated soap being more than about 1:3; and (c) the balance being an aqueous solvent system and minor ingredients, the pH of said composition being from about 8 to about 12.5, and said composition being essentially free of boramide.

2. The composition of claim 1 wherein said nonionic detergent surfactant has an HLB of from about 6 to about 18.

3. The composition of claim 2 wherein said nonionic detergent surfactant has an HLB of from about 8 to about 16.

4. The composition of claim 3 wherein said nonionic detergent surfactant has an HLB of from about 10 to about 15.

5. The composition of claim 1 wherein said nonionic detergent surfactant is a fatty alcohol containing from about 6 to about 22 carbon atoms ethoxylated with from about 2.5 to about 12 moles of ethylene oxide per mole of fatty alcohol.

6. The composition of claim 5 wherein said nonionic detergent surfactant is a fatty alcohol containing from about 8 to about 18 carbon atoms ethoxylated with from about 4 to about 10 moles of ethylene oxide per mole of fatty alcohol.

7. The composition of claim 6 wherein said nonionic detergent surfactant is a fatty alcohol containing from about 8 to about 14 carbon atoms ethoxylated with from about 5 to about 8 moles of ethylene oxide per mole of fatty alcohol.

8. The composition of claim 1 wherein said pH is from about 8.5 to about 11; said nonionic detergent surfactant is present at a level of from about 1% to about 25%; and the ratio of said nonionic detergent surfactant to said unsaturated soap is from about 1:2 to about 8:1.

9. The composition of claim 8 wherein said pH is from about 9.5 to about 10.5; said nonionic detergent surfactant is present at a level of from about 2% to about 20%; and the ratio of said nonionic detergent surfactant to said unsaturated soap is from about 1:1 to about 6:1.

10. The composition of claim 9 wherein said nonionic detergent surfactant is present at a level of from about 2.5% to about 15% and the ratio of said nonionic detergent surfactant to said unsaturated soap is from about 2:1 to about 4:1.

11. The composition of claim 1 wherein said unsaturated soap is comprised of fatty acids in which the fatty acids comprise: from about 50% to about 95% oleic, ricinoleic, or mixture of oleic and ricinoleic acids; less than about 15% of saturated fatty acid; and from about about 2% to about 35% of polyunsaturated fatty acids and a water soluble cation.

12. The composition of claim 11 wherein said fatty acids comprise: from about 60% to about 90% oleic, ricinoleic, or mixture of oleic and ricinoleic acids; from about 5% to about 10% of saturated fatty acid; and from about about 5% to about 20% of polyunsaturated fatty acids.

13. The composition of claim 12 wherein said fatty acids comprise: from about 70% to about 90% oleic, ricinoleic, or mixtures of oleic and ricinoleic acids; less than about 4% of stearic fatty acid; and from about about 5% to about 10% of polyunsaturated fatty acids.

14. The composition of claim 13 wherein said fatty acids comprise less than about 2% stearic acid.

15. The composition of claim 14 wherein said fatty acids comprise less than about 1% stearic acid.

16. The composition of claim 11 wherein said water soluble cation of said unsaturated soap is selected from the group consisting of: sodium, potassium, ammonium, substituted ammonium, and mixtures thereof.

17. The composition of claim 11 wherein said water soluble cation of said unsaturated soap is protonated beta-aminoalkanol compound having the formula:

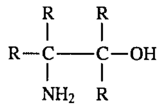

wherein each R is selected from the group consisting of hydrogen and alkyl groups containing from one to four carbon atoms and the total of carbon atoms in the compound is from three to six.

18. The composition of claim 1 containing, as an extra ingredient, from about 0.1% to about 3.5% of synthetic anionic detergent surfactant.

19. The process of cleaning hard surfaces comprising diluting the composition of claim 1 in water at a ratio of from about 512:1 to about 32:1.

20. The process of cleaning hard surfaces comprising diluting the composition of claim 1 in water at a ratio of from about 150:1 to about 100:1.

21. A hard surface detergent composition comprising: (a) nonionic detergent surfactant; (b) unsaturated soap of fatty acids having a tiler of less than about 10° C. comprised of fatty acids in which the fatty acids comprise: from about 50% to about 90% oleic, ricinoleic, or mixture of oleic and ricinoleic acids; less than about 15% of saturated fatty acid; and from about 2% to about 35% of polyunsaturated fatty acids and a water soluble cation that is protonated 2-amino-2-methylpropanol, the ratio of said nonionic detergent surfactant to said unsaturated soap being more than about 1:3; and (c) the balance being an aqueous solvent system and minor ingredients, the pH of said composition being from about 8 to about 12.5, and said composition being essentially free of boramide.

* * * * *